2,910,458

TRIPOLYMER OF STYRENE, C₅ TERTIARY AND NON-TERTIARY MONOOLEFIN

Hans G. Goering, Elizabeth, and Julius P. Rocca, Linden, N.J., assignors to Esso Research and Engineering Company, a corporation of Delaware No Drawing. Application June 28, 1954
Serial No. 439,930

6 Claims. (Cl. 260—80.5)

This invention relates to the preparation of new and useful tripolymers of hydrocarbons, comprising: (1) a polymerizable aliphatic tertiary olefin such as isobutylene, (2) a non-tertiary olefin of 4–6 C atoms, such as n-pentene, and (3) a monoolefin containing a cyclic nucleus, such as styrene.

The aliphatic tertiary olefin is preferably one having 4 to 8 or 10 carbon atoms capable of forming by itself (under suitable conditions) a linear polymer having a molecular weight of at least 800, as determined by the viscosity method explained in Staudinger's book, "Die Hochmolekularen Organischen Verbindungen," H. Staudinger, Berlin 1932, Verlag Von Julius Stringer, page 56. A particularly desirable olefin for this purpose is an iso-olefin, especially a methyl 2-delta-1 olefin such as iso-butylene, methyl-2 butene-1, etc. These tertiary mono-olefinic compounds form high molecular weight linear polymers which are plastic solids, substantially saturated with respect to hydrogen (iodine number not more than about 10, and generally between 1 and 5). This type of polymerization is attributed to olefins having the general formula $R(R')C=CH_2$ in which R and R' are alkyl groups, preferably having 1 to 4 or 5 carbon atoms, and R preferably being different from R'.

The second ingredient is a non-tertiary olefin of 4–6 carbon atoms, such as butene-1, butene-2, secondary amylenes, hexenes, etc., or mixtures of two or more such non-tertiary alkenes.

The third ingredient is an olefinic compound containing a cyclic nucleus, preferably an aromatic nucleus and includes styrene, methyl styrene, cyclohexene, indene, coumarone, divinyl benzene, dipentene, pinene, alpha phellandrane, etc., or mixtures thereof.

The first two ingredients of this reaction may be found associated together in crude refinery cuts, such as a refinery $C_4$ cut, a refinery $C_5$ cut, etc., from which the diolefins (if any were present) had been removed.

My mixing the three monomers and subjecting the mixture to polymerization a soft resin is obtained.

Before polymerization it is desirable to make sure that the reaction mixture is present in one phase, i.e. that no substantial separation of the constituents has taken place. If the materials are immiscible, a mutual solvent for both may be added to obtain homogeneity. Such a solvent may be propane, butane, cyclohexane, liquid carbon dioxide, sulfur dioxide, methyl chloride, chloroform, trichlorethane, carbon tetrachloride, dichlorethylene, acid treated naphtha, and the like.

The polymerization may be carried out at temperatures from 50° C. to 0° C. or lower, to −44° C. When employing isobutylene as the tertiary olefin it is desirable to use temperatures not above 0° C. preferably −20° C. to −40° C. Higher temperatures up to 50° C. may be used with higher molecular weight tertiary olefins. The mixture is cooled to the desired temperature and an active halide catalyst is added, such as boron fluoride, aluminum chloride, titanium chloride, tin tetrachloride and the like. In the case of boron fluoride, only a small amount of the gas (−.01 to 0.1%) need be bubbled through, since the polymerization is quite violent and instantaneous. If a solvent such as propane or butane is employed, the heat of polymerization causes evaporation of some of the solvent, and this may be recompressed and used again in the process. Non-volatile diluents, e.g. mineral lube oils, may also be present. Pressures of 1 to 100 atmospheres or more may be used.

After completion of the polymerization, residual catalyst is removed by washing the product with water and finally with dilute aqueous caustic soda. The volatile solvent may be removed or not.

The copolymers produced according to this process are interesting in that they generally acquire desirable modified properties of the individual polymers, yet they are not mechanical mixtures but true chemical compounds. They are also quite resistant to oxidation and attack by acids and alkalies. The structure of such compounds depends upon the proportions of the individual ingredients employed.

The proportion of the monomers employed in the mixture may vary from

1–25% non-tertiary olefin, preferably at least 5%.
10–98% isoolefin t-olefin, preferably not more than 90%.
1–75% cyclic olefin, preferably at least 5%.

By adjusting the proportions of the three raw materials, copolymers of substantially any desired hardness, melting point, plasticity, etc., may be obtained.

Another advantage of this invention is that it permits use of commercially available mixtures of tertiary and non-tertiary olefins as normally present in petroleum refinery $C_4$, $C_5$ and $C_6$ cuts (from which diolefins have been removed) without separating the tertiary from non-tertiary olefins, but merely adding styrene or the like and polymerizing. This avoids expensive fractional distillation of close-boiling compounds. The styrene appears to assist the non-tertiary olefins to copolymerize.

The invention will be more clearly understood by the following example:

EXAMPLE

A diolefin-free refinery $C_5$ cut having the following composition:

| Compound: | Volume percent |
|---|---|
| Butane | 0.4 |
| Isopentane | 22.6 |
| N-pentane | 20.0 |
| Tert. $C_5$ unsat. | 11.6 ⎫ 24.5 |
| 2nd $C_5$ unsat. | 12.9 ⎭ |
| $C_6+$ | 32.5 | was copolymerized with styrene at temperatures from 20 to 40° C. in the presence of aluminum chloride dissolved in ethyl chloride. The following data were obtained:

Table I

| Run No. | C₅-Cut | Styrene, g. | Catalyst | | | Reaction | | Yield, percent | Soft. pt. of resin | Remarks |
|---|---|---|---|---|---|---|---|---|---|---|
| | | | G. AlCl₃/ 100 cc. ethyl chloride, g. | Volume Used, cc. | Efficiency, g. resin/ g. AlCl₃ | Time, min. | Temp., ° C. | | | |
| 1 | 1,000 g. containing 245 g. C₅ unsat. | 400 | 4.8 | 325 | 34 | 59 | 40 to 28 | 82 | Very soft | Ice water condenser used (lost ethyl chloride). |
| 2 | ......do...... | 750 | 3.1 | 500 | 61 | 55 | 40 to 23 | 95 | 70° C. | Dry Ice condenser used—no gas lost. |

The data show that run 2 having the higher styrene content (about 75% of all unsaturates, compared to 62% in run 1) resulted in a higher yield (95% compared to 82% in run 1) and greater catalyst efficiency (61 compared to 34). It is believed that the styrene helps to make the non-tertiary pentenes enter into the copolymerization.

These copolymers are especially suitable as addition agents to mineral or fatty oils in concentrations of 0.01 to 10% for increasing viscosity and viscosity index. They may be added to greases, resins, rubbers (such as caoutchouc, crepe, smoke sheet, guayule, polymerized butadiene or isoprene, polychlorprene, terpene-maleic acid polymers and derivatives, polyolefin sulfides, halogenated rubbers, haloformed rubber, such as that obtained by reacting rubber with chlorstannic acid, polyisobutylene, benzene-ethylene dichloride condensation product, and the like) with or without the addition of vulcanizing agents followed by curing. Pigments, dyes, antioxidants, etc., may be added to the copolymers. The copolymers may also be mixed with powdered or granular solids, e.g. carbon black, ZnO, clay, chalk, etc., mineral or esterwaxes, asphalts, polysulfones, coating compositions such as paints, varnishes and lacquers, cellulose esters and ethers, self supporting films, and the like. The copolymers can also be halogenated or reacted with sulfur chloride to produce new useful derivatives.

These copolymers, especially the thermoplastic ones, are also desirable for use in coating or impregnating paper, cloth, wood, metal, bricks, tiles, etc., preserving fruits, vegetables, shrubbery, etc., sealing cuts and wounds on trees, roofing paper, shingles, substitute for tar and asphalt for roofing, paving, making building blocks, etc., as a binder for cork, asbestos, straw, etc., in making synthetic floor covering of the linoleum type, or artificial building boards or roof shingles, as a binder for making laminated products such as paper-paper, cloth-cloth, paper-metal foil, glass-glass (alone or with tough unbreakable film intermediate), and many other uses.

The tripolymers of this invention have good oil-solubility, and have in general better viscosity-index improving properties for any certain increase in viscosity at 210° F. than simple polyisobutylene of the same Staudinger mol. wt., and better resistance to shear breakdown than simple copolymers of a tertiary olefin and styrene.

This application is a continuation-in-part of application Serial No. 111,418, filed August 20, 1949, now Patent 2,683,138.

The nature of the present invention having thus been set forth, what is claimed as new and useful and desired to be secured by Letters Patent is:

1. The process which comprises copolymerizing, at a temperature of 20–40° C. and in the presence of aluminum chloride dissolved in ethyl chloride, a feed consisting of about 62–75% by weight of styrene and 38–25% of a mixture of C₅ tertiary and non-tertiary monoolefinically unsaturated hydrocarbons, said tertiary and non-tertiary C₅ monoolefinically unsaturated hydrocarbons being present in a ratio of about 48% of the tertiary monoolefinically unsaturated hydrocarbons to 52% of the non-tertiary monoolefinically unsaturated hydrocarbons.

2. The process which comprises copolymerizing, at a temperature of 20–40° C. and in the presence of aluminum chloride dissolved in ethyl chloride, a feed consisting of about 62% by weight of styrene and 38% of a mixture of C₅ tertiary and non-tertiary monoolefinically unsaturated hydrocarbons, said tertiary and non-tertiary C₅ monoolefinically unsaturated hydrocarbons being present in a ratio of about 48% of the tertiary monoolefinically unsaturated hydrocarbons to 52% of the non-tertiary monoolefinically unsaturated hydrocarbons.

3. The process which comprises copolymerizing, at a temperature of 20–40° C. and in the presence of aluminum chloride dissolved in ethyl chloride, a feed consisting of about 75% by weight of styrene and 25% of a mixture of C₅ tertiary and non-tertiary monoolefinically unsaturated hydrocarbons, said tertiary and non-tertiary C₅ monoolefinically unsaturated hydrocarbons being present in a ratio of about 48% of the tertiary monoolefinically unsaturated hydrocarbons to 52% of the non-tertiary monoolefinically unsaturated hydrocarbons.

4. A product consisting essentially of a tripolymer of 62–75% by weight of styrene and 38–25% of a mixture of C₅ tertiary and non-tertiary monoolefinically unsaturated hydrocarbons, said tertiary and non-tertiary C₅ monoolefinically unsaturated hydrocarbons being present in a ratio of about 48% of the tertiary monoolefinically unsaturated hydrocarbons to 52% of the non-tertiary monoolefinically unsaturated hydrocarbons.

5. A product consisting essentially of a tripolymer of 62% by weight of styrene and 38% of a mixture of C₅ tertiary and non-tertiary monoolefinically unsaturated hydrocarbons, said tertiary and non-tertiary C₅ monoolefinically unsaturated hydrocarbons being present in a ratio of about 48% of the tertiary monoolefinically unsaturated hydrocarbons to 52% of the non-tertiary monoolefinically unsaturated hydrocarbons.

6. A product consisting essentially of a tripolymer of 75% by weight of styrene and 25% of a mixture of C₅ tertiary and non-tertiary monoolefinically unsaturated hydrocarbons, said tertiary and non-tertiary C₅ monoolefinically unsaturated hydrocarbons being present in a ratio of about 48% of the tertiary monoolefinically unsaturated hydrocarbons to 52% of the non-tertiary monoolefinically unsaturated hydrocarbons.

References Cited in the file of this patent

UNITED STATES PATENTS

| | | |
|---|---|---|
| 2,118,945 | Reppe | May 31, 1938 |
| 2,274,749 | Smyers | Mar. 3, 1942 |
| 2,327,705 | Frolich | Aug. 24, 1943 |
| 2,421,082 | Pier | May 27, 1947 |
| 2,604,465 | Schneider et al. | July 22, 1952 |
| 2,609,359 | Sparks et al. | Sept. 2, 1952 |
| 2,610,962 | Smyers | Sept. 16, 1952 |
| 2,683,138 | Goering et al. | July 6, 1954 |